United States Patent [19]

Colla

[11] 4,255,828
[45] Mar. 17, 1981

[54] BATTERY TERMINAL POST CLEANING TOOL

[76] Inventor: Dan P. Colla, 5043 W. Montana St., Chicago, Ill. 60639

[21] Appl. No.: 61,367

[22] Filed: Jul. 27, 1979

[51] Int. Cl.³ ............................................. H01R 43/00
[52] U.S. Cl. .............................. 15/236 R; 15/104.04; 145/3.8; 408/204
[58] Field of Search ............ 15/104.04, 236 R, 236 C, 15/105, 104.01 P; 408/204, 205; 145/3.8; 29/81 G

[56] References Cited

U.S. PATENT DOCUMENTS

| | | | |
|---|---|---|---|
| 2,198,609 | 4/1940 | Forbes | 145/3.8 X |
| 2,204,516 | 6/1940 | Stone | 15/104.04 X |
| 2,298,975 | 10/1942 | Shelburne | 408/204 |
| 3,717,895 | 2/1973 | McFarland et al. | 15/105 |
| 3,946,456 | 3/1976 | Martin et al. | 15/105 |

FOREIGN PATENT DOCUMENTS 666719  2/1952  United Kingdom .................. 15/236 R Primary Examiner—Edward L. Roberts
Attorney, Agent, or Firm—Silverman, Cass & Singer, Ltd.

[57] ABSTRACT

A tool for cleaning the terminal posts of a storage battery, the posts being of different diameters. A socket body having an inside diameter large enough to engage over the battery post has a cut-away window in the circumferential wall thereof. The socket body is rotatable by means of a conventional socket wrench. A spring steel clip is movably affixed on the outside circumference of the socket with a free end thereof extending through the window into the well of the socket. The free end provides a scraping edge to engage the circumferential surface of a selected post when the socket is installed and enable said scraping edge to remove corrosive deposits upon rotation of the socket body.

6 Claims, 3 Drawing Figures

BATTERY TERMINAL POST CLEANING TOOL

BACKGROUND OF THE INVENTION

1. Field of the Invention

The present invention relates generally to tools for cleaning the electrical terminal posts of storage batteries such as those commonly used in automobiles. More particularly, the invention relates to such a tool which incorporates a resilient blade to scrape corrosion from such battery posts which is adjustable in position so that it can be used for cleaning posts of different diameters. Further, the tool is structured for convenient and efficient advantages in use with a conventional socket wrench.

2. Description of the Prior Art

Corrosion of the terminal posts of batteries is a common and well-known cause of failure of automobiles to start. Such corrosion is the product of the chemical interaction between the lead alloy of the posts and gases in the air or gases released by the electrolytic cells of the battery itself. Since the corrosion exhibits a high resistance to the flow of electricity, it acts as an insulator and prevents the proper flow of current in the battery circuit.

To insure continued proper operation of the automobile, it is necessary to remove the corrosion from the battery terminal posts. In the past, this has been accomplished by means of sandpaper, knife blades, or wire brushes manually manipulated to scrape and abrade the corroded surfaces of the posts. Of course, such techniques require the exercise of considerable effort and patience in order to obtain an acceptable result and to avoid damage to the battery posts being cleaned.

More recently, various specialized tools have been designed to facilitate the removal of battery post corrosion. Examples of such tools, particularly ones utilizing resilient blades, are disclosed in U.S. Pat. Nos. 1,692,911; 2,204,516; 3,717,895; 3,802,793; and 3,946,456.

However, the tools disclosed in said patents are not without significant shortcomings. They are somewhat awkward to use, particularly in tight spaces; they are less than totally effective in properly removing the corrosion from the terminal post and are not well suited to clean terminal posts of different sizes. They are not designed for use with other conventional tools; nor can they be easily stored along with other conventional tools.

Many of these shortcomings are accentuated by the relative inaccessibility of the terminal posts of the batteries as installed in late-model automobiles. Such batteries often are positioned close to a fenderwell with the terminals obscured by sheetmetal, wires, and other fittings which commonly clutter the engine compartment. As a result, several difficulties often arise when attempting to clean the posts. The mechanic using the prior art cleaning tool can easily cut his hands on the sharp sheet metal and fittings surrounding the battery where access spacing is very limited. This is especially dangerous because of the presence of the corrosion on the posts. Also, since few tools are designed to efficiently remove corrosion from terminal posts of different sizes, the progress of the scraping must be frequently checked to assure that the corrosion is removed, but the terminal post is not scored or otherwise damaged. This is tedious at best. Some devices are actually a multiplicity of tools aggregated onto a single frame. Although there may be some advantages to such a design, the variety of tools on the frame makes it difficult to rotate in a confined space. Again, this can cause injuries to the tool user.

The use of these tools would be facilitated if they could be used in conjunction with other conventional tools to give them a longer reach. Finally, it should be noted that if the battery terminals cannot be properly cleaned while the battery is positioned in the car, the only alternative is to remove the battery from the engine compartment. This, however, increases the cost of performing the cleaning task.

SUMMARY OF THE INVENTION

The present invention provides a battery terminal post cleaning tool having a supporting or socket body which encircles the post. The socket body is provided with a resilient clip and blade member which can be adjusted to be used for cleaning terminal posts of different diameters. The clip has a free end extending through a window opening to the inside of the body. The free end provides a scraping edge to engage the circumferential surface of a selected post when the body is engaged thereover to clean the post. The supporting body includes means for receiving the drive shaft of a standard ratchet wrench for imparting rotational movements to the body. The tool is similar in shape to a socket normally used with a socket wrench and is thus compact and can be stored with other sockets of a set.

DESCRIPTION OF THE PREFERRED EMBODIMENT

Figure 1:
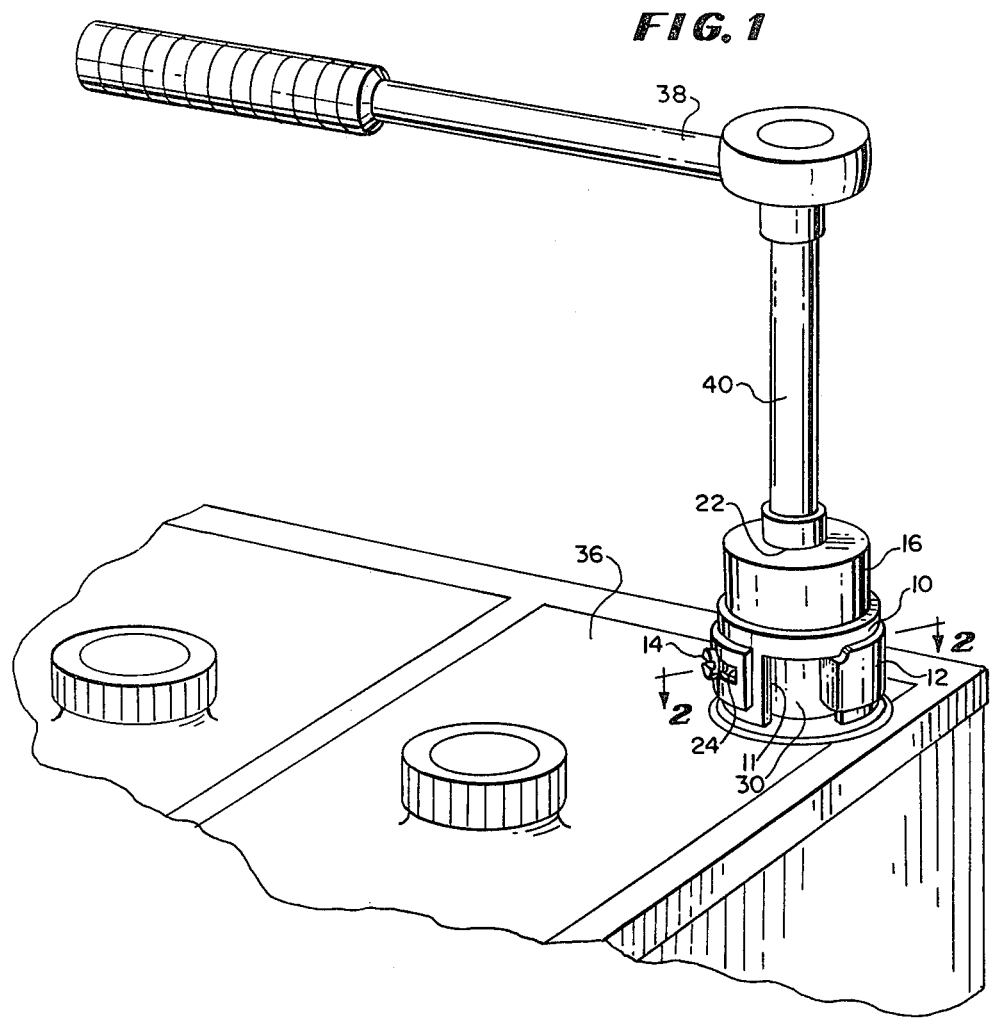
FIG. 1 is a perspective view of the tool of the invention engaged over a battery terminal post for cleaning thereof, there being a drive shaft and handle engaged on the tool to facilitate rotation thereof.

The tool of the invention comprises supporting or socket body 10, adjustable resilient clip 12, set screw 14, and drive shaft receiver 16. The supporting body 10 has a machined inside surface 11 with a diameter of dimension suitable to enable the body to fit over the largest battery terminal it is to be used to clean. A cut-out window 18 is provided in the circumferential wall of the supporting body and is substantially the same height as the tallest terminal which is to be cleaned. A tapped hole 20 is provided in the peripheral wall of the supporting body and is machined to receive the set screw 14.

The drive shaft receiver 16 is disposed above the supporting body 10. These two parts may be formed as a single integral unit or may be formed separately and then attached together by a welding process or other suitable means. The receiver defines square hole 22 which is dimensioned to receive a standard size of drive shaft of a ratchet wrench or the extension shaft which is commonly used in conjunction with such wrenches.

Positioned around the periphery of the supporting body is the adjustable resilient clip 12. The clip 12 is formed with slot 24 through which set screw 14 may be inserted. The clip 12 has a square edge 26 at one end 27 of blade section 28, which produces acceptable battery terminal cleaning results. Edge 26 may be ground to provide a sharp edge. The edge of the blade preferably is slightly skewed to accomodate the slight taper of the battery terminal post.

Figure 2:
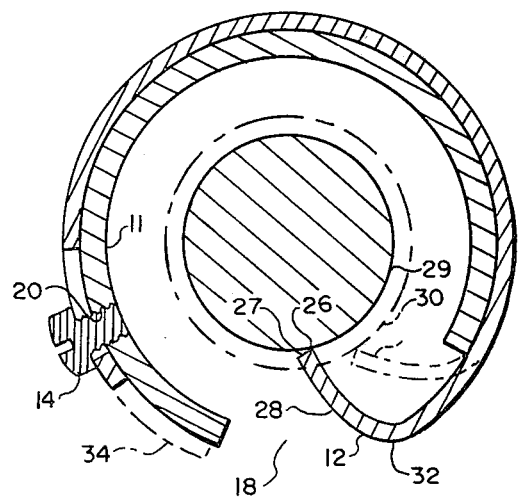
FIG. 2 is a sectional view taken along the line 2—2 of FIG. 1 in the direction indicated generally.

The dimensions of the clip and its slot are selected to enable the clip to be adjusted for operation on battery terminals of different sizes. (Typically the positive and negative posts of a battery are of different diameters.) In FIG. 2, the smaller post 29 is illustrated in solid line while a larger post 30 is shown in phantom outline. When initially fitted, the clip should have an inside radius slightly smaller than the outside radius of the support body. It must also be bent in a substantial angle at bend area 32 to form the blade 28. The clip is slightly expanded to be fit over the supporting body. The position of the clip will be limited by the set screw 14. When the clip is rotated in a clockwise position, the blade portion attains an angled geometry; the edge 26 is in a position appropriate to clean the smaller terminal post 29. If the larger terminal post 30 is to be cleaned, the clip is first manually rotated counter-clockwise to the position shown in phantom line 34. The bend in the blade section is somewhat straightened since it is drawn up against the edge of the cut out window. This straightening together with the geometry of the blade puts the edge 26 in a position suitable for cleaning the larger terminal post 30 since the blade is angled away from the radial line with the center.

When the clip has been adjusted to the desired position, it can be locked into position by means of the set screw 14. The set screw is positioned in slot 24. The length of the slot is selected so that the proper setting for cleaning large or small terminals occurs when the slip is rotated as far as possible in either direction. In this manner, the user of the tool can set the clip by loosening the set screw 14, rotating the clip to the proper position and then retightening the set screw.

In FIG. 1 the tool of the invention is illustrated in position to clean the terminal of a battery 36. The tool is used in conjunction with ratched wrench 38 and extension 40. The wrench and extension are used to extend the reach of the user and to make it easier to rotate the tool around the terminal post. Although the battery illustrated is shown unemcumbered by any automobile fenderwells or the like, normally the battery is obscured when in position in an automobile. The user of the tool with the extension and wrench can apply torque to the tool and cause it to rotate without having to reach down into an automobile engine compartment. Also, the tool is compact and its use will not be interfered with by any adjacent fitting or sheet metal.

Figure 3:
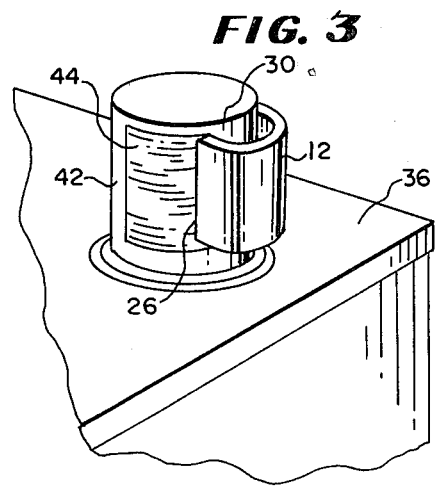
FIG. 3 is a perspective view of a battery terminal post with the steel clip of the invention engaged thereon.

In use, the tool is rotated and the edge of the blade scrapes the corrosion off the circumference of the terminal post. FIG. 3 shows the action of the clip and blade upon the post (the remainder of the tool is not shown for the sake of clarity). As the clip 12 is rotated, the blade 28 is moved over the surface of the post 30. The edge 26 removes the corrosion 42 and leaves a clean surface 44 which will provide a good electrical contact.

The number of times that the tool must be rotated to complete cleaning of the post will depend on the thickness of the corrosion and the resiliency of the clip. However, it is desirable to use a clip of high resiliency so that a minimum of force will press the blade against the post. Although this will necessitate several rotations of the tool to clean the post, it will reduce the possibility of the blade scoring the surface of the battery post lead once the corrosion has been removed.

It will be appreciated that the cleaning tool embodying the invention achieves singular benefits because it can be used with a conventional socket wrench system. Such systems include wrenches, extensions and univeral joints which have been developed for the specific purpose of enabling the automobile mechanic to work swiftly and efficiently in so-called tight areas of an engine compartment. It is believed that the prior art did not solve such problems especially in the case of the compact and sub-compact model of automobile so popular at this time.

While the invention has been described and illustrated with reference to a specific embodiment, it will be understood that the same is capable of various modifications and applications not departing essentially from the spirit thereof which will become apparent to those skilled in the art. The invention is only limited by the claims which are appended hereto.

I claim:

1. A tool for cleaning the terminal posts of a battery comprising, a cylindrical socket with a machined inside surface forming a well of diameter suitable to engage over the largest of the posts on said battery, the socket having a cut-out window provided in the circumferential wall thereof, a spring metal clip adjustably secured for selective sliding movement about the outer surface of the wall of the socket, the clip being of generally arcuate configuration and having a free end extending through the window and into the well of the socket, said free end forming a scraping edge for engaging the circumferential surface of a selected battery post when the tool is installed thereon and rotated with respect thereto to scrape and clean said post, the window being sufficiently wide to permit such sliding movement for scraping of different post sizes.

2. A tool as claimed in claim 1 wherein the clip is adjustable between at least a first and a second position, said free end being angled toward the axis of said socket when the clip is in the first position and said free end being angled away from the axis of said socket when the clip is in the second position.

3. A tool as claimed in claim 1 in which said socket includes a drive shaft receiving hole for cooperation with a drive shaft inserted therein for rotation of the tool.

4. A tool as claimed in claim 1 in which the clip is formed of spring steel.

5. A tool for cleaning the terminal posts of a battery comprising, a cylindrical socket with a machined inside surface forming a well of diameter suitable to engage over the largest of the posts on said battery, the socket having a cut-out window provided in the circumferential wall thereof, a spring metal clip adjustably secured about the outer surface of the wall of the socket, the clip being of generally arcuate configuration and having a free end extending through the window and into the well of the socket, said free end forming a scraping edge for engaging the circumferential surface of a selected battery post when the tool is installed thereon and rotated with respect thereto to scrape and clean said post, said clip being adjustable between at least a first and second position, said free end being angled toward the axis of said socket when the clip is in the first position and said free end being angled away from the axis of said clip when the clip is in the second position.

6. A tool as claimed in claim 5 including a slot formed in said clip and a fastener passing through the slot into the socket to enable locking of the clip in said positions.

* * * * *